UNITED STATES PATENT OFFICE.

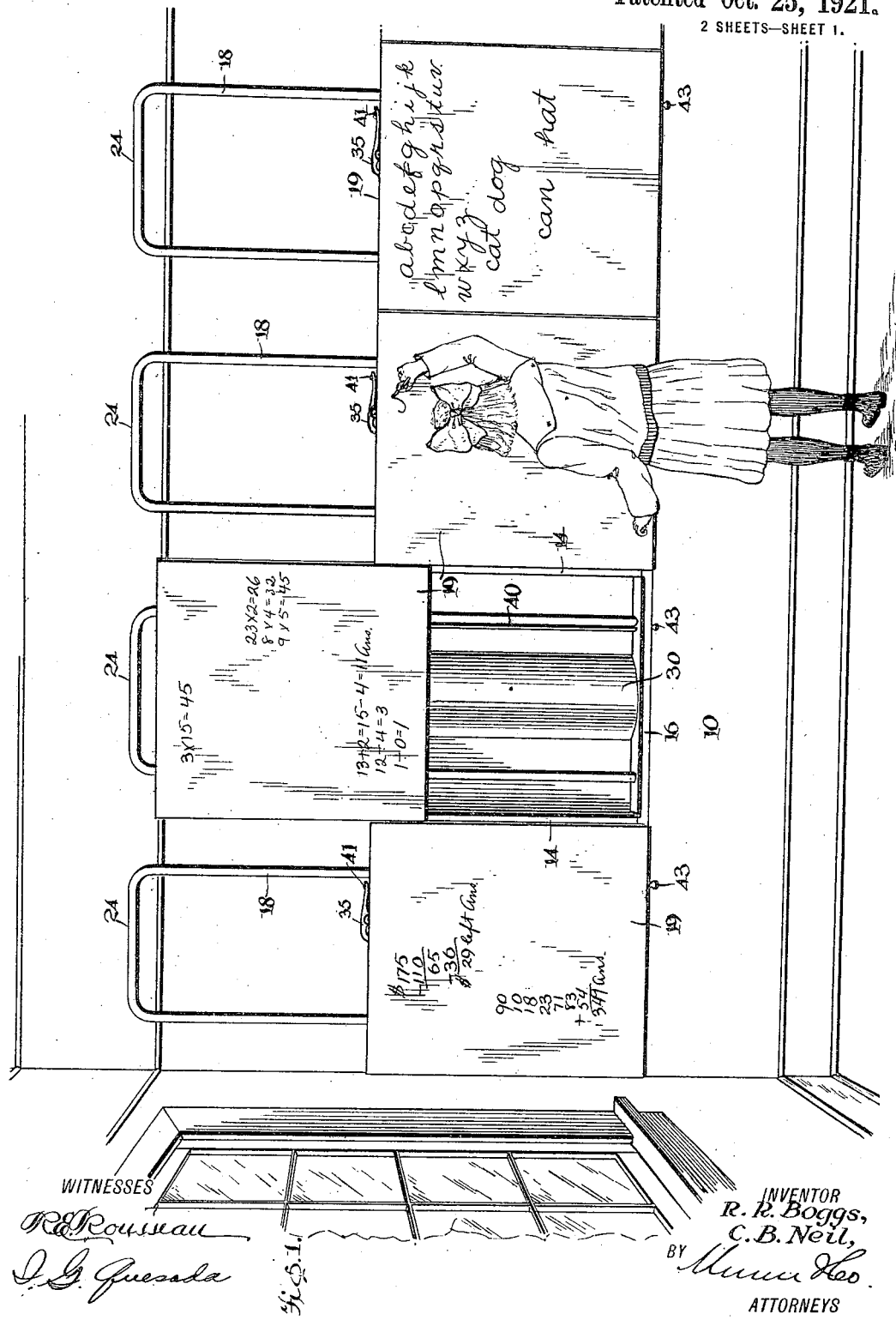

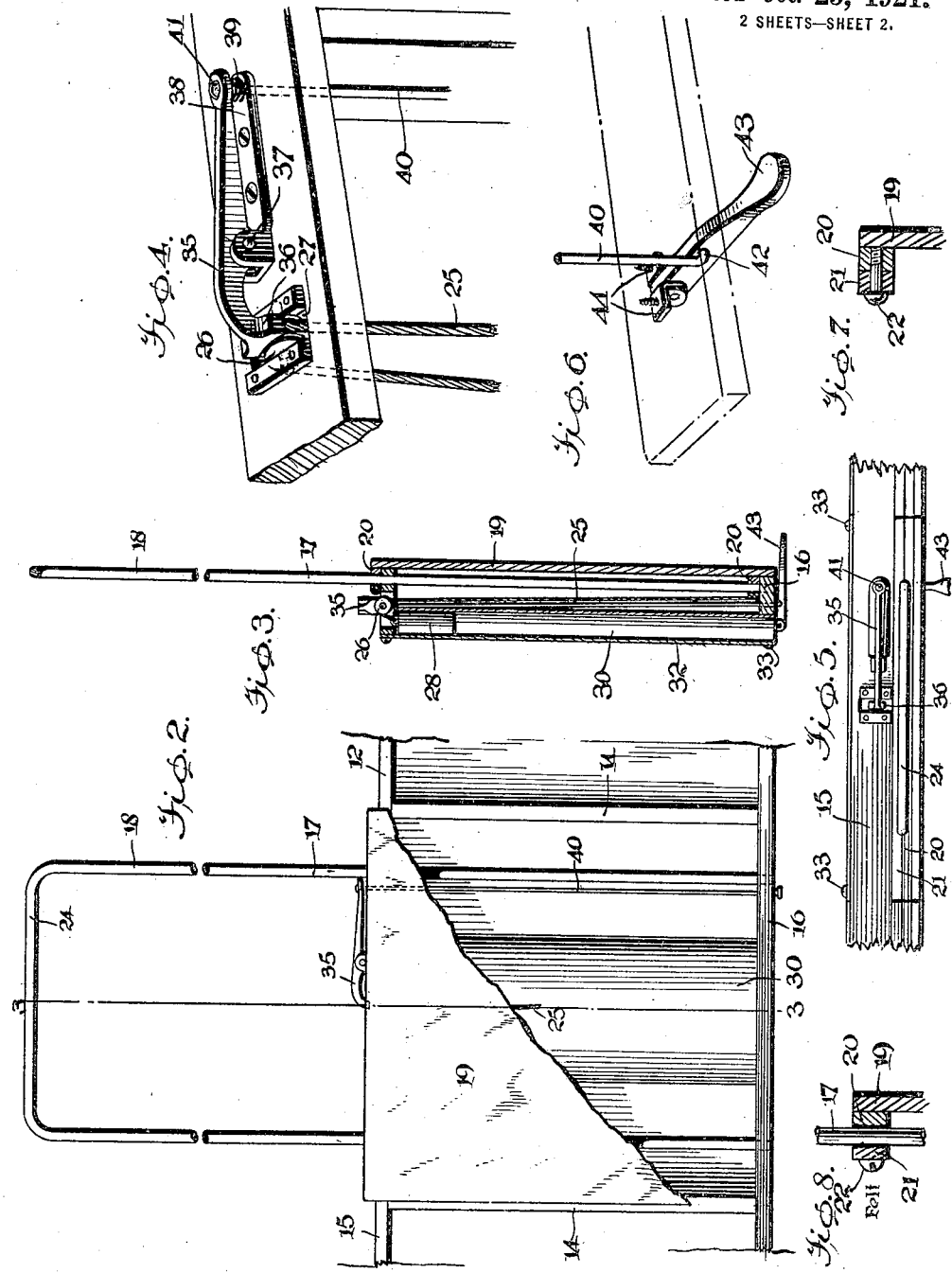

CALVIN B. NEIL AND ROBERT R. BOGGS, OF FANNETTSBURG, PENNSYLVANIA, ASSIGNORS OF ONE-THIRD TO JUELL M. JONES, OF FANNETTSBURG, PENNSYLVANIA.

BLACKBOARD.

1,394,572.   Specification of Letters Patent.   Patented Oct. 25, 1921.

Application filed December 31, 1920. Serial No. 434,258.

*To all whom it may concern:*

Be it known that we, CALVIN B. NEIL and ROBERT R. BOGGS, citizens of the United States, and residents of Fannettsburg, in the county of Franklin and State of Pennsylvania, have invented certain new and useful Improvements in Blackboards, of which the following is a specification.

This invention relates to blackboards especially adapted for use in schools.

An important object of this invention is to provide novel means whereby the blackboard may be raised or lowered to meet varying conditions encountered during use. For instance, the board may be lowered so that a child may write across the upper portion of the board or the board may be elevated somewhat, so that a child or teacher may write on the lower portion of the board without inconvenience.

A further feature of the invention is the fact that the board may be elevated so that the writing on the same may be viewed by all the students in the class room.

A further object of the invention is to provide simple means whereby the board may be held in an adjusted position.

A further object of the invention is to provide an adjustable blackboard embodying a plurality of independently movable sections which may be applied to the walls of a school room or the like without necessitating elaborate alterations.

The invention forming the subject matter of this application also aims to provide a blackboard having a movable writing surface which, when elevated, exposes a compartment having a ledge upon which chalk and erasers may be supported, so that the same will be concealed from view when the blackboard is lowered, and so that the persons writing on the board will not have their clothing soiled through contact with the erasers and chalk.

Other objects and advantages of the invention will be apparent during the course of the following description.

In the accompanying drawings forming a part of this application and in which like numerals are employed to designate like parts throughout the same, Figure 1 is a view of the improved blackboard in use, one of the sections being shown elevated, Fig. 2 is an enlarged fragmentary elevation of the blackboard, the writing surface being broken away, Fig. 3 is a sectional view taken on the line 3—3 of Fig. 2, Fig. 4 is a fragmentary perspective view of a frame embodied in the invention, the view also illustrating a brake for securing the writing surface in an adjusted position, Fig. 5 is a fragmentary plan view of the improved blackboard, Fig. 6 is a perspective of an operating lever and associated elements, Fig. 7 is a detail sectional view through the blackboard, the view illustrating the attaching means for the same, Fig. 8 is a detail sectional view through the blackboard, the view illustrating the means for slidably supporting the same.

In the drawings wherein for the purpose of illustration is shown a preferred embodiment of the invention, the numeral 10 designates one wall of a class room, which is ordinarily provided with a stationary writing slab. The upper portion of this stationary writing slab is in most cases out of reach of children when standing on the floor, and the children cannot therefore write properly on the upper portion of the board. Also it is necessary for the children to assume a cramped position of the body when necessary to write on the lower portion of the board, and for this reason the children cannot ordinarily write legibly on the lower portion of the bord. Further the writing on the board cannot be plainly viewed by all the students since the heads of the students in the front part of the class room interfere with the vision of the students in the rear of the room.

To overcome this difficulty, we have provided a blackboard embodying a plurality of movable sections which may be elevated when it is desired to display the writing of figures on the blackboard to the students, or when it is desired to write on the lower portion of the board.

The invention forming the subject matter of this application consists of a frame 12 which may be applied in any suitable manner to the wall 10 of the class room, and which comprises upstanding sides 14, and top and bottom walls 15 and 16. The side, top and bottom walls of the frame constitute a compartment through which the spaced parallel branches 17 of a U-shaped guide 18 extend. In fact, the branches 17 of the guide 18 extend through the upper wall or side 15 of the frame, and into sockets formed in the underside 16.

Each U-shaped guide 18 forms a means for slidably supporting a writing slab 19 for vertical movement so that the same may be elevated or lowered as desired. A pair of spaced parallel brackets are secured to the rear side of the writing slab 19 and consists of pairs of sections having openings receiving the branches 17 so that the slab may be elevated or lowered. Each bracket includes a stationary strip 20, and a detachable section 21 secured to the section 20 by means of screws 22 whereby the detachable section 21 may be removed when it is desired to detach the slab 19 for the purpose of repair or replacement. The lower bracket of the slab is adapted to contact with the underside of the upper wall 15 so as to limit the upward movement of the slab. The upper bracket of the slab contacts with the connecting portion 24 of the guide simultaneously with the engagement of the lower bracket with the upper wall 15, so as to coöperate with the lower bracket in limiting the upward movement of the slab.

The means for elevating the slab and for securing the same in an adjusted position includes a flexible element 25 which is secured to the lower bracket of the slab and which is trained over a pulley 26 arranged in an opening 27 formed in the upper wall 15 of the frame. One end of the flexible element 25 is connected to a weight 28 slightly heavier than the slab 19, so that when released, the weight 28 will descend and thereby elevate the slab. The weight 28 which is movable vertically is slidable within a housing 30 secured between the upper and lower sides 15 and 16, respectively, of the frame. A metallic backing or cover 32 is secured to the rear side of the frame, by means of screws 33 and has contact with the longitudinal edges of the housing 30, so as to confine the weight 28 within the housing.

The brake for securing the board in adjusted position includes a lever 35 having its forward end formed with a shoe 36 adapted for contact with the periphery of the pulley 26 and with the flexible element 25, so as to hold the flexible element against movement, when necessary. The lever 35 is pivoted intermediate its ends as indicated at 37 to the ears of a base plate 38. The rear portion of lever 38 is pressed upwardly by means of a retractile coil spring 39 which is mounted upon the base plate and which surrounds a vertically movable link 40.

As illustrated in Fig. 6, the lower portion of the link 40 is formed with a bend 42 which is connected to the intermediate portion of an operating lever 43. The forward portion of the lever 43 is connected to brackets 44 and the rear end of the lever is formed with a finger piece 43.

In the operation of the improved blackboard, the slab 19 is normally held in a set position by means of the lever 35 which bears against the flexible element and the pulley, so as to hold the same against movement. When it is desired to elevate the blackboard, the lever 43 is moved downwardly so as to pull the rear portion of the lever downwardly and thereby elevate the shoe 36. When the shoe 36 is elevated, the flexible element 25 and the pulley are released. The downward movement of the weight results in the elevation of the slab and when the slab reaches the desired position, the lever 43 is released, so that the shoe 36 will be promptly engaged with the flexible element for securing the slab against further movement. When the slab is elevated or partly elevated, the same is within a convenient reach of the students, and may also be readily viewed by all the students of the class room as previously set forth.

We claim:

1. A blackboard comprising a frame having upper and lower walls, the lower wall constituting a support for writing devices, a guide having branches extending through the walls of said frame, a writing slab having a bracket provided with openings slidably receiving the branches of said guide, said bracket being adapted to engage one of the walls of said frame to limit the movement of the slab, and elevating means for said slab.

2. A blackboard comprising a frame having upper and lower walls, a guide having branches extending through the walls of said frame, a writing slab having a bracket provided with openings slidably receiving the branches of said guide, said bracket being adapted to engage one of the walls of said frame to limit the movement of the slab, elevating means for said slab, and a releasing device for said elevating means.

3. A blackboard comprising a frame having a compartment adapted for the reception of writing articles, a guide having branches extending through said compartment, a slab having brackets slidably connected to the branches of said guide, and a weight connected to said slab for elevating the same.

4. A blackboard comprising a frame, a guide having branches extending through said frame, a slab having brackets slidably connected to the branches of said guide, a weight connected to said slab for elevating the same, and means to lock the weight against movement.

5. A blackboard comprising a frame, a slab slidably carried thereby, a flexible element connected to the slab, an elevating device connected to said flexible element, a brake, spring means normally engaging said brake with said flexible element, and a releasing link connected to the brake and terminating adjacent the bottom of the frame.

6. A blackboard comprising a frame having a compartment, a U-shaped guide having branches extending through said compartment, a slab having brackets provided with openings slidably receiving the branches of said guide, said brackets constituting stop elements for limiting the movement of said slab, a pulley carried by said frame, a flexible element trained over said pulley and secured to said slab, and arranged within said compartment, a weight having connection with said flexible element, a housing receiving said weight, and a brake engaging said flexible element and said pulley for securing the weight against movement.

7. A blackboard comprising a frame, a slab slidably carried thereby, a brake for locking the slab against movement, spring means urging the brake to its operative position, a rigid link connected to the brake, and an operating lever carried by the lower portion of said frame and connected to one end of said link.

CALVIN B. NEIL.
ROBERT R. BOGGS.